(12) United States Patent
Smith et al.

(10) Patent No.: US 6,656,342 B2
(45) Date of Patent: Dec. 2, 2003

(54) GRADED CATALYST BED FOR SPLIT-FEED HYDROCRACKING/HYDROTREATING

(75) Inventors: Ben D. Smith, Vacaville, CA (US); Richard O. Moore, Jr., San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 210 days.

(21) Appl. No.: 09/826,476

(22) Filed: Apr. 4, 2001

(65) Prior Publication Data

US 2002/0146358 A1 Oct. 10, 2002

(51) Int. Cl.$^7$ .................. C10G 65/02; C10G 65/12
(52) U.S. Cl. .................. 208/58; 208/59; 208/60; 208/80; 208/89; 208/97
(58) Field of Search ............... 208/58, 59, 60, 208/80, 89, 97; 422/191, 194

(56) References Cited

U.S. PATENT DOCUMENTS

| | | | |
|---|---|---|---|
| 3,248,316 A | | 4/1966 | Barger, Jr. et al. |
| 3,617,498 A | | 11/1971 | Kittrell |
| 3,894,938 A | * | 7/1975 | Gorring et al. ............... 208/97 |
| 4,092,238 A | | 5/1978 | Iona |
| 4,173,529 A | | 11/1979 | Bauer |

(List continued on next page.)

FOREIGN PATENT DOCUMENTS

| | | |
|---|---|---|
| DE | 214 859 | 10/1984 |
| EP | 0 321 305 | 6/1989 |

(List continued on next page.)

OTHER PUBLICATIONS

U.S. patent application 09/227,783 entitled "Hydrocracking and Hydrotreating Separate Refinery Streams", Cash and Dahlberg.

*Primary Examiner*—Walter D. Griffin
(74) *Attorney, Agent, or Firm*—Burns, Doane, Swecker & Mathis, L.L.P.

(57) ABSTRACT

A method for hydroprocessing hydrocarbon products, preferably Fischer-Tropsch products, and a reactor useful for performing the method, are disclosed. The reactor includes one or more first catalyst beds comprising a catalyst useful for conducting relatively severe hydroprocessing and one or more second catalyst beds comprising a catalyst useful for conducting relatively mild hydroprocessing. The second catalyst beds are located at a position in the reactor where they can receive the products from the first catalyst bed(s), at least one of each of the first and second catalyst bed(s) comprises a catalyst grading scheme sufficient to remove at least a portion of any particulates from their respective feeds, and the reactor is set up to receive hydrocarbon feeds at a position above or within the first catalyst bed(s) and above or within the second catalyst bed(s). A first hydrocarbon feed with a relatively high boiling point is introduced to the first catalyst bed(s) and is subjected to relatively severe hydroprocessing. A feed comprising 1) the products from the hydroprocessing of the first hydrocarbon feed and 2) a second hydrocarbon feed with a relatively low boiling point is introduced to the second catalyst beds and is subjected to relatively mild hydroprocessing. The catalyst grading scheme minimizes pressure drop build-up through the catalyst beds. The hydrocarbon feeds are preferably derived, in whole or in part, from Fischer-Tropsch synthesis, although they can include products from petroleum refining or other suitable sources. In one embodiment, the relatively high boiling fraction is a predominantly $C_{20}+$ fraction and the relatively low boiling fraction is a predominantly $C_{5-20}$ fraction.

23 Claims, 1 Drawing Sheet

U.S. PATENT DOCUMENTS

| | | |
|---|---|---|
| 4,211,635 A | 7/1980 | Chen |
| 4,347,121 A * | 8/1982 | Mayer et al. .................. 208/58 |
| 4,615,796 A | 10/1986 | Kramer |
| 4,851,109 A | 7/1989 | Chen et al. |
| 4,960,504 A * | 10/1990 | Pellet et al. .............. 208/111.3 |
| 5,114,563 A * | 5/1992 | Lok et al. ................... 208/114 |
| 5,217,603 A * | 6/1993 | Inoue et al. ............ 208/251 H |
| 5,378,348 A | 1/1995 | Davis et al. |
| 5,397,454 A * | 3/1995 | Zones et al. .................. 208/46 |
| 5,409,599 A | 4/1995 | Harandi |
| 5,603,824 A | 2/1997 | Kyan et al. |
| 5,690,896 A | 11/1997 | Stangeland et al. |
| 5,770,044 A | 6/1998 | Ellis et al. |
| 5,817,594 A * | 10/1998 | McNamara et al. ........ 502/313 |
| 5,837,208 A | 11/1998 | Grott et al. |
| 5,851,381 A | 12/1998 | Tanaka et al. |
| 6,017,443 A | 1/2000 | Buchanan |
| 6,096,190 A | 8/2000 | Cash |
| 6,103,101 A | 8/2000 | Fragelli et al. |
| 6,179,995 B1 | 1/2001 | Cash et al. |
| 6,200,462 B1 | 3/2001 | Cash et al. |
| 6,210,559 B1 | 4/2001 | Cook et al. |
| 6,224,747 B1 | 5/2001 | Cash et al. |
| 6,274,029 B1 | 8/2001 | Wittenbrink et al. |
| 6,296,757 B1 | 10/2001 | Wittenbrink et al. |
| 6,299,759 B1 | 10/2001 | Bradway et al. |

FOREIGN PATENT DOCUMENTS

| | | |
|---|---|---|
| EP | 609 079 | 7/1998 |
| EP | 921 184 | 6/1999 |
| WO | WO 97/03750 | 2/1997 |
| WO | WO 99/41329 | 8/1999 |
| WO | WO 99/47626 | 9/1999 |
| WO | WO 00/20535 | 4/2000 |
| WO | WO 01/57158 | 8/2001 |

\* cited by examiner

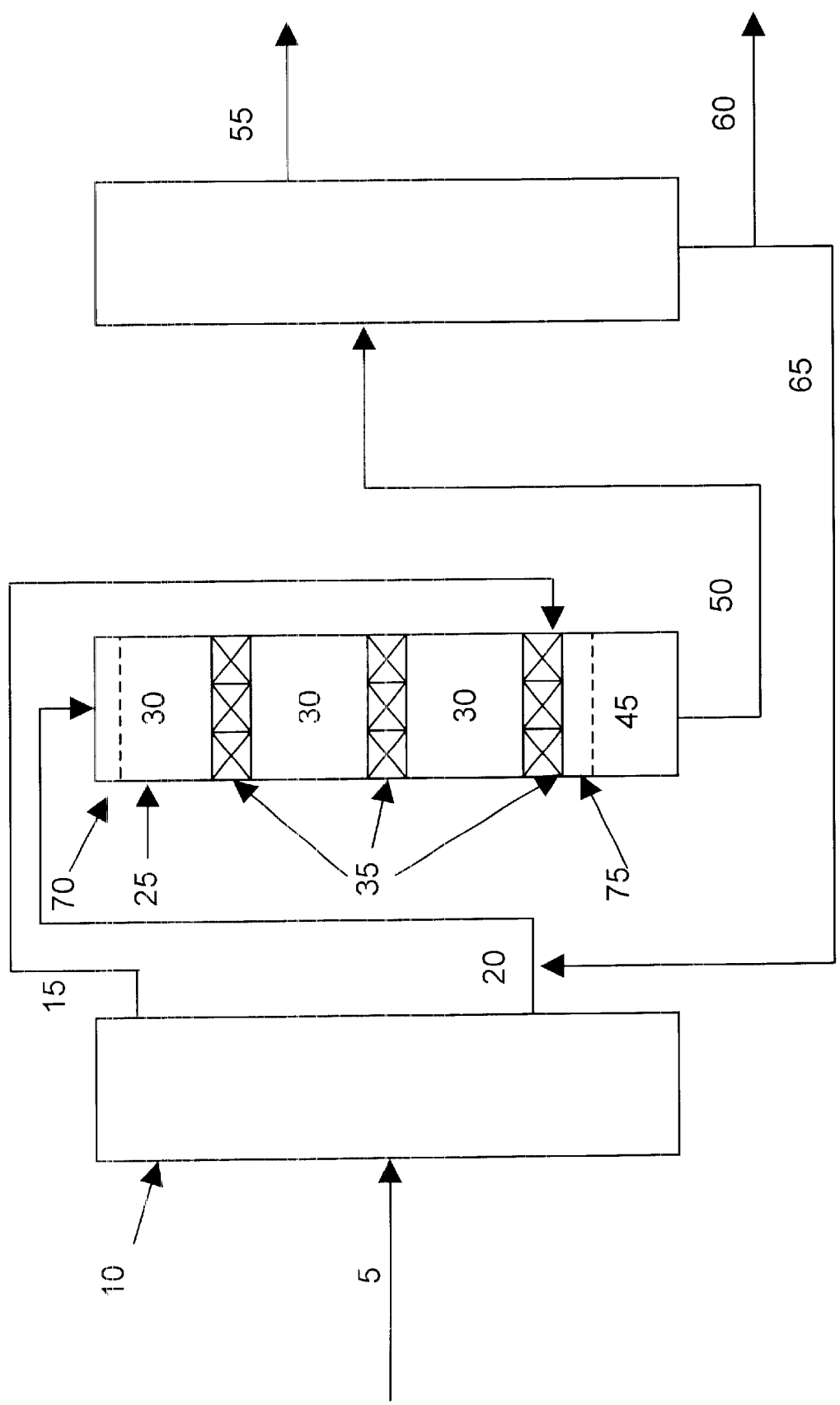

GRADED CATALYST BED FOR SPLIT-FEED HYDROCRACKING/HYDROTREATING

BACKGROUND OF THE INVENTION

The majority of combustible liquid fuel used in the world today is derived from crude oil. However, there are several limitations to using crude oil as a fuel source. For example, crude oil is in limited supply, it includes aromatic compounds believed to cause cancer, and contains sulfur and nitrogen-containing compounds that can adversely affect the environment.

Alternative sources for developing combustible liquid fuel are desirable. Natural gas is an abundant source. The conversion of natural gas to combustible liquid fuel typically involves converting the natural gas, which is mostly methane, to synthesis gas, or syngas, which is a mixture of carbon monoxide and hydrogen. An advantage of using fuels prepared from syngas is that they typically do not contain appreciable amounts of nitrogen and sulfur and generally do not contain aromatic compounds. Accordingly, they have less health and environmental impact than conventional petroleum-based fuels. Fischer-Tropsch synthesis is a preferred means for converting syngas to higher molecular weight hydrocarbon products.

Fischer-Tropsch synthesis is often performed under conditions which produce a large quantity of $C_{20}+$ wax, which must be hydroprocessed to provide distillate fuels and other useful products. Often, the wax is hydrocracked to reduce the chain length, and hydrotreated to reduce oxygenates and olefins to paraffins. Although some catalysts have been developed with selectivity for longer chain hydrocarbons, the hydrocracking tends to reduce the chain length of all of the hydrocarbons in the feed. When the feed includes hydrocarbons that are already in a desired range, for example, the distillate fuel range, hydrocracking of these hydrocarbons is undesirable. The same limitations are observed when hydroprocessing other feeds, such as those derived from crude oil.

Processes have been developed which use a downflow reactor with multiple beds, where a hydrocracking catalyst is present on the first bed or beds, and a milder catalyst is present on one or more beds lying below the hydrocracking catalyst beds. The feed is split into at least a relatively high boiling and a relatively low boiling fraction. The relatively higher boiling fraction is passed through the hydrocracking catalyst beds, and the lower boiling fraction is introduced at one or more different locations in the reactor and passed through the milder catalyst beds. This type of processing is referred to herein as "split-feed" processing. An example of such a process is described in U.S. Pat. No. 5,603,824 to Kyan et al., the contents of which are hereby incorporated by reference, which discloses a process for upgrading a waxy, sulfur-containing hydrocarbon feed mixture.

Fixed bed hydroprocessing reactors used for hydrocracking, hydrotreating, dewaxing and other related processes are often subject to pressure drop build-up through the fixed beds of solid catalyst pellets. This pressure drop build-up can be caused by contaminates found in the feed stream (particulates, rust and scale from piping and other equipment, etc.), from soluble metals originating in crude oil, or from products of undesired side reactions, for example, the reaction of Fe and S to form FeS or from the polymerization of olefinic hydrocarbon molecules. The pressure drop is almost always most pronounced at the top of the reactor, usually in the first of multiple serial beds, where the catalyst particles often act as a crude filter for these materials. In the most severe cases, the contaminates form a crust near the top of the first catalyst bed, eventually requiring plant shutdown to avoid permanent mechanical damage to reactor internals and associated equipment.

The problem is often mitigated by removing the contaminant before entering the hydroprocessing reactor (i.e., by filtration) or by using a number of top-catalyst bed "grading" schemes. One such catalyst grading scheme is described in U.S. Pat. No. 4,615,796 to Kramer, the contents of which are hereby incorporated by reference. A limitation of this approach when used for split-feed hydroprocessing is that only the contaminants in the higher boiling fraction are removed. Solid particulate contaminants present in the lower boiling fraction can foul the lower catalyst beds.

It would be advantageous to provide reactors and methods for hydroprocessing hydrocarbon feedstocks using split-feed hydroprocessing that minimize the pressure drop build-up associated with solid particulate contaminants. The present invention provides such reactors and methods.

SUMMARY OF THE INVENTION

The present invention is directed to a method for hydroprocessing hydrocarbon products, preferably Fischer-Tropsch products, and a reactor useful for performing the method. The reactor includes one or more first catalyst beds comprising a catalyst useful for conducting relatively severe hydroprocessing (preferably hydrocracking) and one or more second catalyst beds comprising a catalyst useful for conducting relatively mild hydroprocessing (preferably hydrotreatment and/or hydroisomerization). The second catalyst beds are located at a position in the reactor where they can receive the products from the first catalyst bed(s), at least one of each of the first and second catalyst bed(s) comprises a catalyst grading scheme, and the reactor is set up to receive hydrocarbon feeds at a position above or within the first catalyst bed(s) and above or within the second catalyst bed(s).

A first hydrocarbon feed with a relatively high boiling point is subjected to relatively severe hydroprocessing. A feed comprising 1) the products from the hydroprocessing of the first hydrocarbon feed and 2) a second hydrocarbon feed with a low boiling point which is relatively lower than the first hydrocarbon feed that also includes particulate contaminants is introduced to the second catalyst beds and is subjected to relatively mild hydroprocessing. The catalyst grading scheme minimizes pressure drop build-up through the catalyst beds.

In the invention, a method is provided for hydroprocessing a hydrocarbon feed comprising:

(a) setting up a reactor system which comprises:
(b) one or more first catalyst bed(s) comprising a catalyst useful for conducting relatively severe hydroprocessing on a hydrocarbon feed, and
(c) one or more second catalyst bed(s) comprising a catalyst useful for conducting relatively mild hydroprocessing on a hydrocarbon feed,
wherein the second catalyst bed(s) are located at a position in the reactor where they can receive the products from the first catalyst bed(s), at least one of each of the first and second catalyst bed(s) comprises a catalyst grading scheme, and the reactor is set up to receive hydrocarbon feeds to be hydroprocessed at a position above or within the first catalyst bed(s) and above or within the second catalyst bed(s),
(d) introducing a first hydrocarbon feed with a relatively high boiling point and comprising particulate contaminants to the first catalyst bed(s), (e) subjecting the first hydrocarbon feed to relatively severe hydroprocessing, (f) passing a feed blend comprising the products from the hydroprocessing of the first hydrocarbon feed blended with a second hydrocarbon feed having a relatively low boiling point compared with the first hydrocarbon feed, and (g) subjecting the feed blend to relatively mild hydroprocessing.

The hydrocarbon feeds are preferably derived, in whole or in part, from Fischer-Tropsch synthesis, although they can include products from petroleum refining or other suitable sources. In one embodiment, the relatively high boiling fraction has a normal boiling point of greater than about 650° F. and is composed predominantly of $C_{20}+$ components and the relatively low boiling fraction has a normal boiling point below about 700° F. and is composed predominantly of $C_{5-20}$ components.

BRIEF DESCRIPTION OF THE DRAWING

The FIGURE is an illustrative schematic flow diagram representing one preferred embodiment of the invention, but the invention is applicable to all appropriate refineries and/or chemical processes.

DETAILED DESCRIPTION OF THE INVENTION

The present invention is directed to a method for hydroprocessing hydrocarbon products, preferably Fischer-Tropsch products, and a reactor suitable for performing the method. The method involves splitting a hydrocarbon feed into at least two fractions, a relatively low boiling fraction and a relatively high boiling fraction. The relatively high boiling fraction is subjected to a relatively severe hydroprocessing step. The products of the relatively severe hydroprocessing step are combined with the relatively low boiling fraction and the combined feed is subjected to a relatively mild hydroprocessing step. The relatively severe hydroprocessing step is preferably a hydrocracking step and the relatively mild hydroprocessing step is preferably a hydrotreatment step. Both hydroprocessing steps are carried out in a single hydroprocessing reactor, preferably a downflow reactor, that includes multiple catalyst beds, or, alternatively, two close coupled series reactors with addition of the second stream but no product removal between reactors. The relatively severe hydroprocessing step (typically hydrocracking) is performed in the topmost beds. The relatively mild hydroprocessing step(typically hydrotreatment) is performed in one or more catalyst beds on both the products of the relatively severe hydroprocessing step and the relatively lower boiling fraction.

The reactor includes one or more beds for conducting the relatively severe hydroprocessing step and one or more beds, below (i.e. downstream from) the first bed(s), for conducting the relatively mild hydroprocessing step. The topmost bed(s) for the relatively severe hydroprocessing step and the relatively mild hydroprocessing step each include a graded catalyst layering scheme to, e.g. preheat the feed to the catalyst beds, remove high molecular weight materials which would otherwise foul the catalyst, and remove solid particulates from the respective feedstocks.

The feedstocks are preferably derived, in whole or in part, from Fischer-Tropsch synthesis, although they can include products from petroleum refining or other suitable sources. In one embodiment, the relatively higher boiling fraction is a predominantly $C_{20}+$ fraction and the relatively lower boiling fraction is a predominantly $C_{5-20}$ fraction.

The method and reactor are advantageous for many reasons. The reactor is advantageously set up to minimize fouling of all of the catalyst beds, not just the uppermost beds. The method allows a relatively low boiling fraction (preferably a predominantly $C_{5-20}$ fraction) to quench the high temperature products from a severe hydroprocessing (preferably hydrocracking) step. The relatively low boiling fraction is not subjected to the same severe hydroprocessing conditions as is the relatively high boiling fraction. Isolation of products in the desired $C_{5-20}$ range, for example, mid-distillates, can be maximized by minimizing the severe hydroprocessing of products in the $C_{5-20}$ range. Further, by removing the predominantly $C_{5-20}$ fraction from the feed to the hydrocracking reactor, the throughput of predominantly $C_{20}+$ hydrocarbons to the reactor is increased.

In one aspect, the methods reduce the number of reactor vessels required for hydroprocessing in a refinery, as well as the downtime spent replacing fouled catalyst beds. The methods can also extend the life of the hydrocracking catalyst by minimizing contact of the relatively low boiling fraction with the hydrocracking catalysts.

Definitions

Hydrocracking generally refers to breaking down the high molecular weight components of hydrocarbon feed to form other, lower molecular weight products. Hydrotreatment hydrogenates double bonds, reduces oxygenates to paraffins, and desulfurizes and denitrifies hydrocarbon feeds. Hydroisomerization converts at least a portion of the linear paraffins into isoparaffins. The terms "relatively severe hydroprocessing" and "hydrocracking" are used interchangeably, and are intended to include other severe hydroprocessing steps in place of or in addition to hydrocracking. The terms "relatively mild hydroprocessing" and "hydrotreatment" are used interchangeably, and are intended to include other mild hydroprocessing steps in place of or in addition to hydrotreatment.

Light hydrocarbon feedstock: These feedstocks can include methane, ethane, propane, butane and mixtures thereof. In addition, carbon dioxide, carbon monoxide, ethylene, propylene and butenes may be present.

The terms "relatively low boiling" and "relatively high boiling" fraction are relative terms. They are intended to apply broadly to virtually any hydrocarbon feedstock, but preferably relate to streams derived in whole or in part from Fischer-Tropsch synthesis. More preferably, these terms relate to a fraction with a normal boiling point below 700° F. in which at least 80% by weight, more preferably 85% by weight, and most preferably, at least 90% by weight of the components have a boiling point in the range of between 50 and 700° F. and composed predominantly of components having carbon numbers in the range of 5 to 20, i.e. $C_{5-20}$, and a fraction in which at least 80% by weight, more preferably 85% by weight, and most preferably, at least 90% by weight of the components have a boiling point higher than 650° F. and composed predominantly of $C_{20}+$ components. Where such terms are used herein, they are intended to include other product streams.

A 650° F.+ containing product stream is a product stream that includes greater than 75% by weight 650 F.+ material, preferably greater than 85% by weight 650° F.+ material, and, most preferably, greater than 90% by weight 650° F.+ material as determined by ASTM D2887 or other suitable methods. The 650° F. containing product stream is similarly defined.

Paraffin: A hydrocarbon with the formula $C_nH_{2n+2}$.

Olefin. A hydrocarbon with at least one carbon—carbon double bond.

Oxygenate: A hydrocarbonaceous compound that includes at least one oxygen atom.

Distillate fuel: A material containing hydrocarbons with boiling points between about 60° and 800° F. Within the broad category of middle distillate fuels are specific fuels that include: naphtha, jet fuel, diesel fuel, kerosene, aviation gas, fuel oil, and blends thereof. A middle distillate fuel generally boils above the normal boiling point of a naphtha (i.e. gasoline) product, and may be recovered from as a distillate fraction from a atmospheric, and preferably a vacuum distillation column.

Diesel fuel: A material suitable for use in diesel engines and conforming to one of the following specifications:

ASTM D 975—"Standard Specification for Diesel Fuel Oils"

European Grade CEN 90

Japanese Fuel Standards JIS K 2204

The United States National Conference on Weights and Measures (NCWM) 1997 guidelines for premium diesel fuel The United States Engine Manufacturers Association recommended guideline for premium diesel fuel (FQP-1A)

Jet fuel: A material suitable for use in turbine engines for aircraft or other uses meeting one of the following specifications:

ASTM D1655

DEF STAN 91-91/3 (DERD 2494), TURBINE FUEL, AVIATION, KEROSINE TYPE, JET A-1, NATO CODE: F-35.

International Air Transportation Association (IATA) Guidance Materials for Aviation, 4th edition, March 2000.

Natural Gas

Natural gas is an example of a light hydrocarbon feedstock. In addition to methane, natural gas includes some heavier hydrocarbons (mostly $C_{2-5}$ paraffins) and other impurities, e.g., mercaptans and other sulfur-containing compounds, carbon dioxide, nitrogen, helium, water and non-hydrocarbon acid gases. Natural gas fields also typically contain a significant amount of $C_5$+ material, which is liquid at ambient conditions.

The methane, and optionally ethane and/or other hydrocarbons, can be isolated and used to generate syngas. Various other impurities can be readily separated. Inert impurities such as nitrogen and helium can be tolerated. The methane in the natural gas can be isolated, for example in a demethanizer, and then de-sulfurized and sent to a syngas generator.

Syngas

Methane (and/or ethane and heavier hydrocarbons) can be sent through a conventional syngas generator to provide synthesis gas. Typically, synthesis gas contains hydrogen and carbon monoxide, and may include minor amounts of carbon dioxide, water, unconverted light hydrocarbon feedstock and various other impurities. The presence of sulfur, nitrogen, halogen, selenium, phosphorus and arsenic contaminants in the syngas is undesirable. For this reason, it is preferred to remove sulfur and other contaminants from the feed before performing the Fischer-Tropsch chemistry or other hydrocarbon synthesis. Means for removing these contaminants are well known to those of skill in the art. For example, ZnO guard beds are preferred for removing sulfur impurities. Means for removing other contaminants are well known to those of skill in the art.

Fischer-Tropsch Synthesis

Catalysts and conditions for performing Fischer-Tropsch synthesis are well known to those of skill in the art, and are described, for example, in EP 0 921 184 A1, the contents of which are hereby incorporated by reference in their entirety. In the Fischer-Tropsch synthesis process, liquid and gaseous hydrocarbons are formed by contacting a synthesis gas (syngas) comprising a mixture of $H_2$ and CO with a Fischer-Tropsch catalyst under suitable temperature and pressure reactive conditions. The Fischer-Tropsch reaction is typically conducted at temperatures of about from 300° to 700° F. (149 to 371° C.) preferably about from 400° to 550° F. (204° to 228° C.); pressures of about from 10 to 600 psia, (0.7 to 41 bars) preferably 30 to 300 psia, (2 to 21 bars) and catalyst space velocities of about from 100 to 10,000 cc/g/hr., preferably 300 to 3,000 cc/g/hr.

The products may range from $C_1$ to $C_{200}$+ with a majority in the $C_5$–$C_{100}$+ range. The reaction can be conducted in a variety of reactor types for example, fixed bed reactors containing one or more catalyst beds, slurry reactors, fluidized bed reactors, or a combination of different type reactors. Such reaction processes and reactors are well known and documented in the literature. Slurry Fischer-Tropsch processes, which is a preferred process in the practice of the invention, utilize superior heat (and mass) transfer characteristics for the strongly exothermic synthesis reaction and are able to produce relatively high molecular weight, paraffinic hydrocarbons when using a cobalt catalyst. In a slurry process, a syngas comprising a mixture of $H_2$ and CO is bubbled up as a third phase through a slurry in a reactor which comprises a particulate Fischer-Tropsch type hydrocarbon synthesis catalyst dispersed and suspended in a slurry liquid comprising hydrocarbon products of the synthesis reaction which are liquid at the reaction conditions. The mole ratio of the hydrogen to the carbon monoxide may broadly range from about 0.5 to 4, but is more typically within the range of from about 0.7 to 2.75 and preferably from about 0.7 to 2.5. A particularly preferred Fischer-Tropsch process is taught in EP0609079, also completed incorporated herein by reference for all purposes.

Suitable Fischer-Tropsch catalysts comprise on or more Group VIII catalytic metals such as Fe, Ni, Co, Ru and Re. Additionally, a suitable catalyst may contain a promoter. Thus, a preferred Fischer-Tropsch catalyst comprises effective amounts of cobalt and one or more of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 and about 50 weight percent of the total catalyst composition. The catalysts can also contain basic oxide promoters such as $ThO_2$, $La_2O_3$, MgO, and $TiO_2$, promoters such as $ZrO_2$, noble metals (Pt, Pd, Ru, Rh, Os, Ir), coinage metals (Cu, Ag, Au), and other transition metals such as Fe, Mn, Ni, and Re. Support materials including alumina, silica, magnesia and titania or mixtures thereof may be used. Preferred supports for cobalt containing catalysts comprise titania. Useful catalysts and their preparation are known and illustrative, but nonlimiting examples may be found, for example, in U.S. Pat. No. 4,568,663.

Product Isolation from Fischer-Tropsch Synthesis

The products from Fischer-Tropsch reactions performed in slurry bed reactors generally include a light reaction product and a waxy reaction product. The light reaction product (a predominantly $C_5$–$C_{20}$ fraction, commonly termed the "condensate fraction") includes hydrocarbons boiling below about 700° F.(e.g., tail gases through middle distillates), with decreasing amounts up to about $C_{30}$. The waxy reaction product (a predominantly $C_{20}+$ fraction, commonly termed the "wax fraction") includes hydrocarbons boiling above about 600° F. (e.g., vacuum gas oil through heavy paraffins), with decreasing amounts down to $C_{10}$. Both the light reaction product and the waxy product are substantially paraffinic. The waxy product generally comprises greater than 70% normal paraffins, and often greater than 80% normal paraffins. The light reaction product comprises paraffinic products with a significant proportion of alcohols and olefins. In some cases, the light reaction product may comprise as much as 50%, and even higher, alcohols and olefins.

Additional Hydrocarbon Streams

The predominantly $C_{5-20}$ and predominantly $C_{20}+$ fractions described above can optionally be combined with hydrocarbons from other streams, for example, streams from petroleum refining. The $C_{5-20}$ fractions can be combined, for example, with similar fractions obtained from the fractional distillation of crude oil. The $C_{20}+$ fractions can be combined, for example, with waxy crude oils, crude oils and/or slack waxes from petroleum deoiling and dewaxing operations.

The predominantly $C_{5-20}$ fraction typically includes a mixture of hydrocarbons, including mono-olefins and alcohols. The mono-olefins are typically present in an amount of at least about 5.0 wt % of the lighter fraction. The alcohols are usually present in an amount typically of at least about 0.5 wt % or more.

The fraction can be transmitted to a position in the hydroprocessing reactor above or within the hydrotreatment beds at an elevated temperature up to about the desired reaction temperature within the beds. However, the predominantly $C_{5-20}$ may be desirably used to quench the reaction effluent leaving the first (i.e. hydrocracking) reaction zone to reduce its temperature. Thus, the temperature of the predominately $C_{5-20}$ fraction may be passed to the reaction vessel at temperatures to as low as 100° F. or below.

Prior to reaction, the pressurized fraction is preferably mixed with a hydrogen-containing gas stream. Adding even a small amount (i.e., less than about 500 SCFB) of hydrogen-containing gas to the fraction before it is heated by the hydrocrackate prevents or minimizes formation of the undesirable heavier molecular weight products.

The source of hydrogen can be virtually any hydrogen-containing gas that does not include significant amounts of impurities that would adversely affect the hydrotreatment catalysts. In particular, the hydrogen-containing gas includes sufficient amounts of hydrogen to achieve the desired effect, and may include other gases that are not harmful to the formation of desired end products and that do not promote or accelerate fouling of the downstream catalysts and hydrotreatment equipment. Examples of possible hydrogen-containing gases include hydrogen gas and syngas. The hydrogen can be from a hydrogen plant, recycle gas in a hydroprocessing unit and the like. Alternately, the hydrogen-containing gas may be a portion of the hydrogen used for hydrocracking the high boiling fraction.

After the hydrogen-containing gas is introduced into the fraction, the fraction can be pre-heated, if necessary, in a heat exchanger. The methods of heating the fractions in the heat exchangers can include any methods known to practitioners in the art. For example, a shell and tube heat exchanger may be used, wherein a heated substance, such as steam or a reaction product from elsewhere in the plant, is fed through an outer shell, providing heat to the fraction in an inner tube, thus heating the fraction and cooling the heated substance in the shell. Alternately, the fraction may be heated directly by passing through a heated tube, wherein the heat may be supplied by electricity, combustion, or any other source known to practitioners in the art.

Hydroprocessing Reactors

Preferably, the reactor is a downflow reactor that includes at least two catalyst beds, with inter-bed redistributors between the beds. The hydroprocessing reactors include at least one catalyst bed for carrying out the relatively severe hydroprocessing (hydrocracking) step, and at least one catalyst bed for carrying out the relatively mild hydroprocessing (hydrotreatment) step, which bed or beds lie below the beds used to carry out the relatively severe hydroprocessing step. The temperature and/or pressure of the relatively severe hydroprocessing catalyst beds can be, and generally are the same as that in the relatively mild hydroprocessing catalyst beds.

The topmost bed or beds for both hydroprocessing steps include a graded catalyst scheme to minimize particulate fouling of the beds. There are preferably intermediate cooling stages between the catalyst beds, which use a quench fluid and preferably include mixing means for mixing the heated hydroprocessing products with the quench fluid. The reactor includes a means for introducing the relatively low boiling fraction below the last bed of the relatively severe hydroprocessing catalyst and above or within the first bed of the relatively mild hydroprocessing catalyst. Preferably, the fraction is introduced as a liquid rather than a gas, to better absorb heat from the heated products of the severe hydroprocessing step. Optionally, the reactor can include a means for removing products from between each catalyst bed. The components of the hydroprocessing reactor are discussed in more detail below.

Catalyst Grading Schemes

As discussed above, the reactor includes a plurality of beds, at least one of which includes a catalyst for conducting relatively severe hydroprocessing, and at least one of which includes a catalyst for conducting relatively mild hydroprocessing. At least one of each of these beds includes a catalyst grading scheme such as are well known in the art, and are described, for example, in U.S. Pat. No. 4,615,796, the contents of which are hereby incorporated by reference. The reactor also includes a feed inlet for each of the beds. An example of a suitable catalyst grading scheme is discussed in detail below.

One type of catalyst grading scheme involves using a plurality of beds, with a first bed or beds used as a guard bed, and a later bed used as a catalytic bed. Accordingly, the scheme involves using a plurality of beds for each of the relatively severe and the relatively mild hydroprocessing steps.

In this type of scheme, a first packed bed of particles for each of the relatively severe hydroprocessing and the relatively mild hydroprocessing steps is in fluid communication with a feed inlet to the reactor. Each such first packed bed extends more than 3 to 18 inches in the direction of flow and includes predominantly particles at least about ⅜ inch in diameter. A second packed bed of particles is preferably in fluid communication with each of the first packed beds and downstream of these first packed beds. The second packed bed extends at least 12 to 48 inches in the direction of flow and includes predominantly particles having diameters within the range of 3/16 to 5/16 inch and smaller than the average diameter of particles in the first beds. If the depth of the 3/16 to 5/16 inch diameter particle bed is insufficient, solids of the critical size, i.e., larger than 10 microns, will pass through and tend to agglomerate at the interface between that bed and the adjacent bed. A third packed bed of particles can be in fluid communication with the second packed bed and downstream of the second packed bed, where the third packed bed includes predominantly particles having diameters below 1/8 inches.

The third packed bed is the catalytic bed, where the other beds are guard beds used to trap solid particulates. The guard bed particles may themselves contain active catalyst materials such as transition metals, etc. The guard bed particles may, in fact, be of the same composition as the main catalyst or contact particles, and may be spent catalyst of that composition.

The packed bed reactor can be maintained at elevated pressures of up to about 3,500 psig and elevated temperatures of up to 1500° F. Preferably, at least one of the first and second packed beds includes substantially spherical particles. The suspended solids often include iron sulfide or materials that have a density similar to that of iron sulfide, and typically have an average diameter in the range of 25 to 250 micrometers. Ideally, the fluid feed contains less than 0.1% by weight solids.

The bed design described above is a deep-bed, guard bed design strategy for high temperature, high pressure hydrocarbon feedstock processing, which is useful for removing suspended solids of greater than 10 microns in diameter from mixed phase gas-liquid-solid feeds. Preferably, the packed bed which is protected from plugging by the guard bed contains catalyst particles less than about 1/8 inch in diameter. Suspended solids greater than about 10 microns in diameter form a critical size range which should be removed from feeds to beds including catalyst particles less than 1/8 inch in diameter.

The packed beds including catalyst particles less than 1/8 inch in diameter are protected from plugging by disposing guard beds upstream of the packed bed of particles. The guard beds have a graded particle size which decreases in the direction of flow. The maximum particle size in the guard beds is typically 3/8 to 1½ inches, however, larger particles can be used if desired. The minimum particle size is slightly above the average particle size of the principal contact particles or catalyst in the packed bed being protected.

As used herein, "particles" refer to the particulate material used as a reactive, catalytic or inert material in guard beds, reactors and filters. Such material, as used herein, is preferably mainly composed of porous inorganic oxides such as alumina, titania, and/or clay, and includes both synthetic and naturally occurring minerals. Such materials must be suitable for petroleum refining processing conditions, i.e., temperatures up to about 1500° F. and pressures up to about 3500 psig. Since petroleum processing conditions of interest are characterized by elevated temperatures and a generally reducing atmosphere, often including hydrogen gas, materials suitable for use herein should be "hydrothermally stable." Such petroleum refining processes include both thermal processes and catalytic processes, e.g., visbreaking, hydrocracking, reforming hydrotreating, sulfur sorbing, hydrofining, etc., and generally include any other petroleum refining processes where a packed bed of particles 1/8 inch in diameter or less could have increased pressure drop due to the presence of solids, such as iron sulfide, in the feedstream. While "petroleum refining" and "petroleum refining conditions" are referred to herein, the packed bed design is applicable to any hydrocarbon feedstock, particularly including those derived from Fischer-Tropsch synthesis, and optionally including those derived from shale, coal and tar sands. Furthermore, the solids suspended in the feedstock may be other than iron sulfide and may include shale solids, tar sands solids or coal tar particulate and ash. A preferred particulate material for the guard beds is a spent catalyst particulate from the same refinery.

Particles are described herein in terms of their average diameters. While spherical particles are very much preferred for use in the guard bed, the guard bed particles can be in other configurations. For non-spherical particles, the diameter is defined as the smallest diameter, i.e., the smallest surface-to-surface dimension through the center or axis of the particle, regardless of the shape of the particle.

The guard beds are preferably used in a downflow packed bed system. The packed bed can be any gravity-packed bed configuration, for example, a fixed bed, a moving bed, or a bed which permits incremental addition of fresh particles.

The word "fluid", as used herein, encompasses both liquid and gaseous phases. The feeds can be liquid-solids, gas-solids, or gas-liquid-solids, and will generally contain no more than about 0.1 weight percent suspended solids. The most preferred application for this invention is the processing of fluids containing less than 10 ppmw of solids, which is typical of petroleum refinery streams and the products of Fischer-Tropsch synthesis. The optimum guard bed design will depend upon the size distribution of solids in the feedstream. Typical solid size distributions of interest have an average diameter between about 5 to 1,000 microns. Solids smaller than about 10 microns generally do not cause plugging problems in downflow packed beds. Solids above 1,000 microns in diameter generally are easily filtered by conventional means, prior to treatment in packed bed reactors. Solids with a size between 10 and 1000 microns are found in a variety of feeds in the hydrocarbon processing industry, for example, the products from Fischer-Tropsch synthesis, naphthas, vacuum and atmospheric residua, vacuum gas oils, diesel and medium distillate streams, and a variety of other feedstocks, including certain solids-lean synthetic oils derived from coal, oil shale and tar sands, etc. The suspended solid in petroleum-derived streams is primarily iron sulfide from scaling of upstream equipment and piping, however, other solids may be present as well.

The guard beds employ in part the theory of impaction in packed beds which is described in Jackson et al., "Entrained Particle Collection in Packed Beds", AICHE Journal, November 1966, pages 1075–1078, which is incorporated herein by reference.

The fluid hourly space velocity will preferably vary from about 1 to about 10 $hr^{-1}$ depending upon the fluid phase and the guard bed length.

Ideally, a guard bed has a continuously decreasing particle size including a region 12 to 48 inches or deeper of particles in the 3/16 to 5/16 inch diameter range. In practice, however, such continuously decreasing size may be difficult to achieve. Satisfactory results can be obtained with a plurality of discrete guard beds with each bed containing particles of predominantly the same size. Consequently, the term "bed" as used herein will include a region of particles of varying particle size within the particle size limits defined for the bed.

It is conceivable that thin intermediate beds or screens may be disposed between one or more of the guard beds. While the reactor should preferably comprise particles whose diameter decreases essentially continuously in the direction of flow, the thin intermediate beds may contain particles larger than those in one or more of the upstream beds. The thin intermediate beds should not, however, comprise particles smaller than downstream beds, as this will promote uneven solids capture, leading to premature pressure drop build-up.

The number of guard beds and the size of the bed particles will depend upon the characteristics of the feed.

Interbed Cooling

Multiple catalyst beds with intermediate cooling stages are typically used to control the extremely exothermic hydroprocessing reactions. The hydroprocessing (i.e., hydrotreating and hydrocracking) reactions begin as soon as the feed contacts the catalyst. Because the reactions are exothermic, the temperature of the reaction mixture increases and the catalyst beds heat up as the mixture passes through the beds and the reactions proceed. In order to limit the temperature rise and control the reaction rate, a quench fluid is typically introduced between the catalyst beds.

Ideally, there is less than a 100° F. temperature rise in each bed, preferably less than about 50° F. per bed, with cooling stages used to bring the temperature back to a manageable level. The heated effluent from each bed is mixed with the quench fluid in a suitable mixing device (sometimes referred to as an inter-bed redistributor or a mixer/distributor) to cool the effluent sufficiently so that it can be sent through the next catalyst bed.

Quenching Fluid

Typically, hydrogen gas is used as a quenching fluid. The hydrogen gas is typically introduced at around 150° F. or above, which is extremely cold relative to the reactant temperatures (typically between 650° and 750° F.). When multiple catalyst beds are used, hydrogen and/or other quench fluids can be used in the intermediate cooling stages. After the final severe hydrocracking catalyst bed, a quench with hydrogen gas may not be required, since the products are combined with the relatively low boiling fraction.

Mixing

Reactor internals between the catalysts beds are designed to ensure both a thorough mixing of the reactants with the quench fluid and a good distribution of vapor and liquid flowing to the next catalyst bed. Good distribution of the reactants prevents hot spots and excessive naphtha and gas make, and maximizes catalyst life. This is particularly important where the relatively high boiling fraction includes an appreciable amount of olefins, which makes it highly reactive. Poor distribution and mixing can result in non-selective cracking of the wax to light gas. Examples of suitable mixing devices are described, for example, in U.S. Pat. No. 5,837,208, U.S. Pat. No. 5,690,896, U.S. Pat. No. 5,462,719 and U.S. Pat. No. 5,484,578, the contents of which are hereby incorporated by reference. A preferred mixing device is described in U.S. Pat. No. 5,690,896.

Introduction of the Relatively Low Boiling Fraction

The reactor includes a means for introducing the relatively low boiling fraction, preferably a predominantly $C_{5-20}$ fraction, below the last severe hydroprocessing catalyst bed and above or within the first mild hydroprocessing catalyst bed. Preferably, the fraction is introduced as a liquid rather than a gas, to better absorb heat from the heated products of the severe hydroprocessing step.

The catalysts and conditions for performing hydrocracking, hydroisomerization and hydrotreating reactions are discussed in more detail below.

Hydrocracking

The heavy fractions described above can be hydrocracked using conditions well known to those of skill in the art. In a preferred embodiment, hydrocracking conditions involve passing a feed stream, such as the heavy fraction, through a plurality of hydrocracking catalyst beds under conditions of elevated temperature and/or pressure. The plurality of catalyst beds may function to remove impurities such as any metals and other solids which may be present, and/or to crack or convert the feedstock. Hydrocracking is a process of breaking longer carbon chain molecules into smaller ones. It can be effected by contacting the particular fraction or combination of fractions, with hydrogen in the presence of a suitable hydrocracking catalyst at hydrocracking conditions, including temperatures in the range of about from 600 to 900° F. (316 to 482° C.) preferably 650° to 850° F. (343 to 454° C.) and pressures in the range about from 200 to 4000 psia (13–272 atm) preferably 500 to 3000 psia (34–204 atm) using space velocities based on the hydrocarbon feedstock of about 0.1 to 10 $hr^{-1}$ preferably 0.25 to 5 $hr^{-1}$. In general, hydrocracking catalysts include a cracking component and a hydrogenation component on an oxide support material or binder. The cracking component may include an amorphous cracking component and/or a zeolite, such as a Y-type zeolite, an ultrastable Y-type zeolite or a dealuminated zeolite. A suitable amorphous cracking component is silica-alumina.

The predominantly $C_{20}$+ fractions described above can be hydrocracked using conditions well known to those of skill in the art. In general, hydrocracking catalysts include a cracking component and a hydrogenation component on an oxide support material or binder. The cracking component may include an amorphous cracking component and/or a zeolite, such as a Y-type zeolite, an ultrastable Y-type zeolite or a dealuminated zeolite. A suitable amorphous cracking component is silica-alumina.

The hydrogenation component of the catalyst particles is selected from those elements known to provide catalytic hydrogenation activity. At least one metal component selected from the Group VIII (IUPAC notation) elements and/or from the Group VI (IUPAC notation) elements are generally chosen. Group VI elements include chromium, molybdenum and tungsten. Group VIII elements include iron, cobalt, nickel, ruthenium, rhodium, palladium, osmium, iridium, and platinum. The amounts(s) of hydrogenation component(s) in the catalyst suitable range from about 0.5% to about 10% by weight of Group VIII metal component(s) and from about 5% to about 25% by weight of Group VI metal component(s), calculated as metal oxide(s) per 100 parts by weight of total catalyst, where the percentages by weight are based on the weight of the catalyst before sulfiding. The hydrogenation components in the catalyst may be in the oxidic and/or the sulfidic form. If a combination of at least a Group VI and a Group VIII metal component is present as (mixed) oxides, it will be subjected to a sulfiding treatment prior to proper use in hydrocracking. Suitably, the catalyst includes one or more components of nickel and/or cobalt and one or more components of molybdenum and/or tungsten and one or more components of platinum and/or palladium. Catalysts containing nickel and molybdenum, nickel and tungsten, platinum and/or palladium are particularly preferred.

The hydrocracking particles used herein may be prepared, for example, by blending or co-mulling active sources of hydrogenation metals with a binder. Examples of suitable binders include silica, alumina, clays, zirconia, titania, magnesia and silica-alumina. Preference is given to the use of alumina as a binder. Other components, such as phosphorous, may be added as desired to tailor the catalyst particles for a desired application. The blended components are then shaped, such as by extrusion, dried and calcined at temperatures up to 1200° F. (649° C.) to produce the finished catalyst particles. Alternatively, equally suitable methods for preparing the amorphous catalyst particles include preparing oxide binder particles, for example, by extrusion, drying and calcining, followed by depositing the hydrogenation metals on the oxide particles, using methods such as impregnation. The catalyst particles, containing the hydrogenation metals, are preferably then further dried and calcined before use as a hydrocracking catalyst.

Preferred catalyst systems include one or more of zeolite Y, zeolite ultrastable Y, SAPO-11, SAPO-31, SAPO-37, SAPO-41, ZSM-5, ZSM-11, ZSM-48, and SSZ-32.

Hydroisomerization

In one embodiment, the hydrocracked products and the predominantly $C_{5-20}$ fraction are hydroisomerized to provide branching, thus lowering the pour point. Hydroisomerization involves passing a mixture of a waxy hydrocarbon stream and hydrogen over a catalyst that contains an acidic component to convert the normal and slightly branched iso-paraffins in the feed to other non-waxy species and thereby generate a product with an acceptable cloud and/or pour point. Typical conditions for all classes involve temperatures from about 400° to 800° F., pressures from about 200 to 3000 psig, and space velocities from about 0.2 to 5 $hr^{-1}$.

Catalysts for hydroisomerization are generally dual-functional catalysts consisting of an acidic component and a metal component. Both components are required to conduct the isomerization reaction. Typical metal components are platinum or palladium, with platinum most commonly used. The choice and the amount of metal in the catalyst is sufficient to achieve greater than 10% isomerized hexadecane products in the test described in U.S. Pat. No. 5,282,958. The acidic catalyst components useful for the hydroisomerization include amorphous silica aluminas, fluorided alumina, ZSM-12, ZSM-21, ZSM-22, ZSM-23, ZSM-35, ZSM-38, ZSM-48, ZSM-57, SSZ-32, ferrierite, SAPO-11, SAPO-31, SAPO-41, MAPO-11, MAPO-31, Y zeolite, L zeolite, and Beta zeolite. Representative process conditions, yields, and product properties are described, for example, in U.S. Pat. Nos. 5,135,638 to Miller, 5,246,566 to Miller; 5,282,958 to Santilli et al.; 5,082,986 to Miller; 5,723,716 to Brandes et al; the contents of each of which is incorporated herein by reference in their entirety. Hydroisomerization is further described in U.S. Pat. Nos. 5,049,536 to Belussi et al.; 4,943,672 to Hamner et al., and EP 0 582 347 to Perego et al., EP 0 668 342 to Eilers et al, PCT WO 96/26993 by Apelian et al.; PCT WO 96/13563 by Apelian et al; the contents of each of which is incorporated herein by reference in their entirety.

Hydrotreatment

During hydrotreating, oxygen, and any sulfur and nitrogen present in the feed is reduced to low levels. Aromatics and olefins are also reduced. Hydrotreating catalysts and reaction conditions are selected to minimize cracking reactions, which reduce the yield of the most desulfided fuel product.

Hydrotreating conditions include a reaction temperature between 400° F.–900° F. (204° C.–482° C.), preferably 650° F.–850° F. (343° C.–454° C.); a pressure between 500 to 5000 psig (pounds per square inch gauge) (3.5–34.6 MPa), preferably 1000 to 3000 psig (7.0–20.8 MPa); a feed rate (LHSV) of 0.5 $hr^{-1}$ to 20 $hr^{-1}$ (v/v); and overall hydrogen consumption 300 to 2000 scf per barrel of liquid hydrocarbon feed (53.4–356 $m^3H_2/m^3$ feed). The hydrotreating catalyst for the beds will typically be a composite of a Group VI metal or compound thereof, and a Group VIII metal or compound thereof supported on a porous refractory base such as alumina. Examples of hydrotreating catalysts are alumina supported cobalt—molybdenum, nickel sulfide, nickel-tungsten, cobalt-tungsten and nickel-molybdenum. Typically such hydrotreating catalysts are presulfided.

The products from the hydrocracking of the predominantly $C_{20}+$ fractions described above are combined with at least a portion of the predominantly $C_{5-20}$ fractions and the combined fractions subjected to hydrotreatment conditions.

In one embodiment, the predominantly $C_{5-20}$ fraction is introduced into a reactor at a level below the last hydrocracking catalyst bed and above or within the hydrotreatment bed. In this embodiment, the temperature and or pressure of the hydrotreatment bed can be, and generally are the same as that in the hydrocracking bed(s). In another embodiment, the products from the hydrocracking reactor are pumped to a separate hydrotreatment reactor, where they are combined with the predominantly $C_{5-20}$ fraction. In this embodiment, the temperature and or pressure of the hydrotreatment reactor can be, and preferably are different from that in the hydrocracking reactor.

Catalysts useful for hydrotreating the combined fractions are well known in the art. See, for example, U.S. Pat. Nos. 4,347,121 and 4,810,357 for general descriptions of hydrotreating catalysts and conditions. Suitable catalysts include noble metals from Group VIIIA, such as platinum or palladium on an alumina or siliceous matrix, and Group VIIIA and Group VIB metals, such as nickel-molybdenum or nickel-tin on an alumina or siliceous matrix. U.S. Pat. No. 3,852,207 describes suitable noble metal catalysts and mild hydrotreating conditions. Other suitable catalysts are described, for example, in U.S. Pat. Nos. 4,157,294 and 3,904,513. The contents of these patents are hereby incorporated by reference.

The non-noble (such as nickel-molybdenum) hydrogenation metal is usually present in the final catalyst composition as an oxide or, more preferably, as a sulfide, when such compounds are readily formed from the particular metal involved. Preferred non-noble metal catalyst compositions contain in excess of about 5 weight percent, preferably about 5 to about 40 weight percent, molybdenum and/or tungsten, and at least about 0.5, preferably about 1 to about 15 weight percent of nickel and/or cobalt determined as the corresponding oxides. The noble metal (such as platinum) catalyst contains in excess of about 0.01 percent metal, preferably between about 0.1 and about 1.0 percent metal. Combinations of noble metals may also be used, such as mixtures of platinum and palladium.

In a preferred embodiment, the hydrotreatment reactor includes a plurality of catalyst beds, wherein one or more beds may function to remove impurities such as any metals and other solids which may be present, one or more additional beds may function to crack or convert the feedstock, and one or more other beds may function to hydrotreat the oxygenates and olefins in the condensate and/or wax fraction.

Method Steps

The relatively high boiling fraction is hydroprocessed through the beds of the relatively severe hydroprocessing catalyst, with cooling between the beds. After the severe hydroprocessing is complete, the effluent from the last severe hydroprocessing bed is combined with the relatively low boiling fraction and the combined fractions subjected to relatively mild hydroprocessing conditions. Preferably, the low boiling fraction is a liquid, not a gas at the temperature at which it is combined with the effluent from the severe hydroprocessing beds, so that the liquid adsorbs more heat from the heated effluent.

The products from the hydrotreatment reaction are preferably separated into at least two fractions, a $C_{5-20}$ fraction and a bottoms fraction. The $C_{5-20}$ fraction can be subject to distillation, catalytic isomerization and/or various additional method steps to provide gasoline, diesel fuel, jet fuel and the like, as known to practitioners in the art.

The bottoms fraction can optionally be recycled to the hydrocracking catalyst beds in the hydroprocessing reactor to provide an additional $C_{5-20}$ fraction. Alternatively, the fraction can be subject to distillation, catalytic isomerization, dewaxing and/or various additional method steps to provide lube base oil stocks, as known to practitioners in the art.

Preferred dewaxing catalysts include SAPO-11, SAPO-31, SAPO-41, SSZ-32, and ZSM-5. Alternatively, or in addition, the fraction can be subjected to solvent dewaxing conditions, as such are known in the art. Such conditions typically involve using solvents such as methylethyl ketone and toluene, where addition of such solvents or solvent mixtures at an appropriate temperature results in the precipitation of wax from the bottoms fraction. The precipitated wax can then be readily removed using means well known to those of skill in the art.

The method described herein will be readily understood by referring to the particularly preferred embodiment in the flow diagram in the accompanying FIGURE. In the FIGURE, a syngas feed (5) is sent to a Fischer-Tropsch reactor (10) and the products of a Fischer-Tropsch synthesis are separated into at least a predominantly $C_{5-20}$ fraction (15) and a predominantly $C_{20}+$ fraction (20). The predominantly $C_{20}+$ fraction is sent to a hydrocracking reactor (25) with a plurality of hydrocracking catalyst beds (30) supported on redistributors (35). After the fraction has passed through the last hydrocracking catalyst bed, it is combined with the predominantly $C_{5-20}$ fraction (15), and passed through one or more hydrotreatment beds (45). In a preferred embodiment, beds 30 and 45 each employ a catalyst grading scheme (70) and (75). The product of the hydrotreatment reaction is split into various fractions, including a predominantly $C_{5-20}$ fraction (55) and a bottoms fraction (60). The bottoms fraction may be recycled (65) to the hydroprocessing reactor.

Those skilled in the art will recognize, or be able to ascertain using no more than routine experimentation, many equivalents to the specific embodiments of the invention described herein. Such equivalents are intended to be encompassed by the following claims.

What is claimed is:

1. A method of producing liquid fuels from a Fischer-Tropsch derived hydrocarbon stream, the method comprising:

a) providing a hydroprocessing reactor having at least one catalyst bed for relatively severe hydroprocessing and at least one catalyst bed for relatively mild hydroprocessing;

b) isolating a heavy fraction and a light fraction from the Fischer-Tropsch derived hydrocarbon stream;

c) subjecting the heavy fraction to relatively severe hydroprocessing;

d) combining the effluent from the relatively severe hydroprocessing step with the light fraction to form a combined stream; and e) subjecting the combined stream to relatively mild hydroprocessing;

wherein at least one of the catalyst beds of the hydroprocessing reactor employs a graded catalyst scheme to remove particulate contaminants from the Fischer-Tropsch derived hydrocarbon stream.

2. The method of claim 1, wherein the relatively severe hydroprocessing step comprises a hydrocracking step.

3. The method of claim 1, wherein severe hydroprocessing step is carried out in a plurality of catalyst beds.

4. The method of claim 1, wherein the relatively mild hydroprocessing step comprises a hydrotreating step.

5. The method of claim 1, wherein the relatively mild hydroprocessing step is carried out in a plurality of catalyst beds.

6. The method of claim 1, wherein the heavy fraction from the Fischer-Tropsch derived hydrocarbon stream comprises a predominantly $C_{20}+$ hydrocarbon stream.

7. The method of claim 1, wherein the light fraction from the Fischer-Tropsch derived hydrocarbon stream comprises a predominantly $C_{5-20}$ hydrocarbon stream.

8. The method of claim 1, wherein the light fraction includes at least 0.1% by weight oxygenates.

9. The method of claim 1, wherein the heavy fraction includes at least 80% by weight paraffins and no more than about 1% by weight oxygenates.

10. The method of claim 1, comprising the step of recovering a product stream from the relatively mild hydroprocessing step, and separating the recovered product stream into at least a predominantly $C_{5-20}$ fraction and a bottoms fraction.

11. The method of claim 10, further comprising recycling the bottoms fraction to the hydroprocessing reactor for relatively severe hydroprocessing.

12. The method of claim 11, wherein the step that comprises recycling the bottoms fraction comprises a dewaxing step that produces a product with a pour point lower than that of the bottoms fraction.

13. The method of claim 1, wherein the catalyst used to carry out the relatively severe hydroprocessing is selected from the group consisting of a Y-type zeolite, an ultrastable Y-type zeolite, ZSM-5, ZSM-11, ZSM-48, SAPO-11, SAPO-31, SAPO-37, SAPO-41, and SSZ-32.

14. The method of claim 1, wherein the graded catalyst scheme comprises a first packed bed of particles in fluid communication with the Fischer-Tropsch derived hydrocarbon stream, the first packed bed of particles extending more than about 3 to 18 inches in the direction of flow of the hydrocarbon stream, and wherein the particles have diameter of at least about 3/8 of an inch.

15. The method of claim 14, wherein the graded catalyst scheme further includes a second packed bed in fluid communication with the first packed bed, the second packed bed of particles extending at least 12 to 48 inches in the direction of flow of the hydrocarbon stream, and wherein the particles have a diameter within the range of about 3/16 to 5/16 of an inch.

16. The method of claim 15, wherein the diameter of the particles in the second packed bed is smaller than the average diameter of the particles in the first packed bed.

17. The method of claim 15, wherein the graded catalyst scheme further includes a third packed bed of particles in fluid communication with the second packed bed, and wherein the third packed bed is downstream from the second packed bed.

18. The method of claim 17, wherein the diameter of the particles in the third packed bed is less than about 1/8 of an inch.

19. The method of claim 14, wherein the first packed bed is a guard bed that removes solid particulates from the Fischer-Tropsch derived hydrocarbon stream.

20. The method of claim 15, wherein the second packed bed is a guard bed that removes solid particulates from the Fischer-Tropsch derived hydrocarbon stream.

21. The method of claim 17, wherein the particles of the third packed bed comprise a catalyst capable of carrying out the relatively severe hydroprocessing step.

22. The method of claim 17, wherein the particles of the third packed bed comprise a catalyst capable of carrying out the relatively mild hydroprocessing step.

23. The method of claim 17, wherein at least the last bed of the graded catalyst scheme used to carry out hydroprocessing is selected from the group consisting of relatively severe hydroprocessing, relatively mild hydroprocessing, and combinations thereof.

* * * * *

UNITED STATES PATENT AND TRADEMARK OFFICE
CERTIFICATE OF CORRECTION

PATENT NO.     : 6,656,342 B2
DATED          : December 2, 2003
INVENTOR(S)    : Ben D. Smith et al.

It is certified that error appears in the above-identified patent and that said Letters Patent is hereby corrected as shown below:

Column 16,
Line 21, please insert -- the relatively -- between "wherein" and "severe".
Line 39, please insert -- further -- between "," and "comprising".

Column 18,
Line 10, please delete "17" and insert therefore -- 1 --.

Signed and Sealed this

Eighteenth Day of May, 2004

JON W. DUDAS
*Acting Director of the United States Patent and Trademark Office*